United States Patent
Zhang et al.

(10) Patent No.: US 6,783,845 B2
(45) Date of Patent: Aug. 31, 2004

(54) ANTI-FOGGING COATING MATERIAL, ANTI-FOGGING COATING, AND ANTI-FOGGING OPTICAL MEMBER

(75) Inventors: Zuyi Zhang, Kanagawa (JP); Teigo Sakakibara, Kanagawa (JP); Masayuki Yamada, Tokyo (JP); Yoshinori Kotani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/360,936

(22) Filed: Feb. 10, 2003

(65) Prior Publication Data

US 2003/0152763 A1 Aug. 14, 2003

(30) Foreign Application Priority Data

Feb. 12, 2002 (JP) ........................................ 2002-034171

(51) Int. Cl.[7] .............................................. B32B 17/06
(52) U.S. Cl. ...................... 428/325; 428/426; 428/432; 428/689; 428/704
(58) Field of Search ................................ 428/323, 325, 428/426, 432, 689, 704

(56) References Cited

U.S. PATENT DOCUMENTS

| | | | |
|---|---|---|---|
| 3,839,078 A | 10/1974 | Birchall et al. | 117/119.6 |
| 5,861,132 A * | 1/1999 | Pratsinis et al. | 423/613 |
| 5,869,187 A | 2/1999 | Nakamura et al. | 428/428 |
| 6,037,289 A * | 3/2000 | Chopin et al. | 502/2 |
| 6,040,053 A | 3/2000 | Scholz et al. | 428/412 |
| 6,071,606 A | 6/2000 | Yamazaki et al. | 428/325 |
| 6,156,409 A * | 12/2000 | Doushita et al. | 428/143 |
| 6,306,932 B1 | 10/2001 | Yamamoto et al. | 523/169 |

FOREIGN PATENT DOCUMENTS

| | | |
|---|---|---|
| EP | 0 887 179 A1 | 12/1998 |
| GB | 2 015 989 A | 9/1979 |
| JP | 54-105120 | 8/1979 |
| JP | 55-154351 | 12/1980 |
| JP | 9-295835 | 11/1997 |
| JP | 10-68091 | 3/1998 |
| JP | 11-61029 | 3/1999 |
| WO | WO 96/29375 A1 | 9/1996 |

OTHER PUBLICATIONS

European Search Report in Application No. 03003043.1 (Jul. 3, 2003).

* cited by examiner

Primary Examiner—Stephen Stein
(74) Attorney, Agent, or Firm—Fitzpatrick, Cella, Harper & Scinto

(57) ABSTRACT

An anti-fogging coating material is disclosed which comprises a phosphoric acid compound binder; and oxide particles having an average particle diameter of 1 to 300 nm mixed with the phosphoric acid compound binder and provides an anti-fogging coating with a high hydrophilic property and a high water absorption property, capable of retaining the high hydrophilic property for a long period of time.

10 Claims, 1 Drawing Sheet

FIGURE
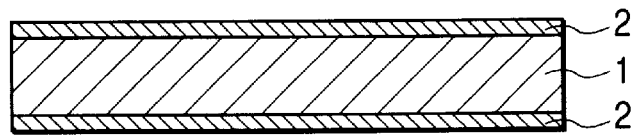

ANTI-FOGGING COATING MATERIAL, ANTI-FOGGING COATING, AND ANTI-FOGGING OPTICAL MEMBER

BACKGROUND OF THE INVENTION

1. Field of the Invention

The present invention relates to an anti-fogging coating material, an anti-fogging coating (or coating film), and an anti-fogging optical member. Specifically, the present invention relates to an anti-fogging coating material which is coated on a glass base material such as a glass mirror or on a metal base material such as a metal mirror to form a porous film having a large strength and continuously maintaining its anti-fogging properties and also relates to an anti-fogging coating and an anti-fogging optical member using the same.

2. Related Background Art

Transparent base materials such as an inorganic glass have widely been used for optical members such as camera lens and mirrors in the past. However, exposure of such a base material to a high humidity atmosphere may cause condensation on a surface thereof, which may refract and diffuse a light. Therefore, the performance of the optical member will be degraded and the appearance thereof will also be impaired. In particular, a dental mirror, a camera eyepiece and so on, when used, will come into contact with a high humidity atmosphere produced by moisture discharged by breathing or the like and are therefore required to have highly increased anti-fogging properties and persistence thereof. Accordingly, attempts are being made to impart anti-fogging properties to a surface of a base material by providing a coating thereon to make the surface hydrophilic or water-repellent.

Japanese Patent Application Laid-Open No. 11-61029 (corresponding to U.S. Pat. No. 6,306,932) discloses an anti-fogging coating material made by blending at least one selected from inorganic alkoxides, hydrolysates of inorganic alkoxides, and hydrolytic condensation polymers of inorganic alkoxides; polyacrylic acids; and polyvinyl alcohols. However, there has been a problem that the anti-fogging coating thus formed by using such a coating material contains organic polymers and will have a low strength.

On the other hand, Japanese Patent Application Laid-Open No. 55-154351 discloses a hydrophilic thin film which is applied to a surface of a base material in order to impart hydrophilic properties to the surface thereof and characterized by containing at least one of molybdenum oxides and tungsten oxides, and phosphorus oxides. This hydrophilic thin film is also characterized by being applied to a base material through a thin film forming technique such as evaporation, sputtering, ion plating, plasma deposition, or chemical vapor deposition. In addition, Japanese Patent Application Laid-Open No. 54-105120 discloses a method for manufacturing an anti-fogging glass characterized by being manufactured by bringing an inorganic glass into contact with a liquid containing $P_2O_5$ or a vapor thereof. However, there has been a problem that the water absorption capacity and the resistance to water of these thin films and anti-fogging glass are insufficient.

Japanese Patent Application Laid-Open No. 9-295835 discloses an anti-fogging thin film characterized in that a thin film formed on a surface of a glass substrate is made into an oxide thin film having a porous structure following a method comprising the steps of preparing a coating solution by using a metal alkoxide compound or a mixed solution of a solution containing dispersed oxide fine particles having a low equilibrium water vapor pressure and a metal alkoxide compound, subjecting the thus obtained solution to hydrolysis and polycondensation reaction in the presence of a solvent, water, an acid and a water-soluble organic polymer; applying the thus obtained coating solution on a surface of a glass substrate and drying the coated substrate; removing the organic polymer by washing with water or a mixed solution of an alcohol and water; and finally baking the coating film at a high temperature. There have been some problems that manufacture of this anti-fogging thin film requires complicated processes and members to which the thin film is applied are limited.

International Publication No. 96/29375 discloses an anti-fogging transparent plate member comprising a transparent base material and a substantially transparent layer containing a photocatalytic semiconductor material, joined to a surface of the base material, wherein the photocatalytic material makes a surface of the layer hydrophilic responding to photoexcitation, thereby allowing the applied condensed water and/or water droplets created by moisture to spread over the surface of the layer so as to prevent the base material from fogging or blurring by the condensed water and/or water droplets created by the moisture. This publication also discloses a method, as one of the methods for forming a layer containing a photocatalytic semiconductor material, in which a suspension containing particles of anatase titania or rutile titania and silica particles is applied to a surface of a base material and sintered at a temperature less than a softening point of the base material.

Japanese Patent Application Laid-Open No. 10-68091 (corresponding to U.S. Pat. No. 6,071,606) discloses a hydrophilic coating characterized in that the hydrophilic coating is a composite film containing titania and an amorphous metal oxide disposed as an outermost layer on a substrate, and that the composite film contains silica and/or alumina particles. This coating contains titania having a photocatalytic activity and is expected to provide the surface with hydrophilic properties by irradiating the surface with a light, however, there remains a problem that contaminants in the air may deposit on the surface when left in a dark place for a long period of time, thereby losing the anti-fogging properties.

As described above, the conventional techniques have been far from satisfying all of the performance requirements such as a film strength, a water absorption capacity, and persistence of the hydrophilic properties, and limited in terms of applications.

SUMMARY OF THE INVENTION

It is, therefore, an object of the present invention to solve the above described problems related to the conventional techniques and provide an anti-fogging coating with high hydrophilic properties and high water absorption properties capable of retaining the high hydrophilic properties for a long period of time, an optical member having the anti-fogging coating, and an anti-fogging coating material for forming the anti-fogging coating.

The object of the present invention is achieved by an anti-fogging coating material, comprising a phosphoric acid compound binder; and oxide particles having an average particle diameter of 1 to 300 nm mixed with the phosphoric acid compound binder.

The object of the present invention is also achieved by an anti-fogging coating formed by using the anti-fogging coating material described above.

The object of the present invention is further achieved by an anti-fogging optical member, comprising a base material;

and an anti-fogging coating formed on the base material by using the anti-fogging coating material described above.

BRIEF DESCRIPTION OF THE DRAWING

FIGURE is a schematic cross-sectional view showing an embodiment of an anti-fogging optical member in accordance with the present invention.

DESCRIPTION OF THE PREFERRED EMBODIMENTS

The anti-fogging coating material of the present invention comprises a phosphoric acid compound binder and oxide particles having an average particle diameter of 1 to 300 nm mixed with the phosphoric acid compound binder. The anti-fogging coating formed by using this anti-fogging coating material is solidified by bonding the oxide particles to one another through a condensation reaction of hydroxyl groups directly attached to phosphorus atoms (referred to as P—OH) of the phosphoric acid compound binder. This anti-fogging coating is excellent in water resistance or the like, and also makes it possible to retain high water absorption properties which result from hydrophilic properties derived from the phosphoric acid compound binder and a high porosity derived from the oxide particles. Thus, the optical member having such an anti-fogging coating formed on a base material produces a significant effect surpassing any prior art described previously.

The phosphoric acid compound binder used in the present invention has P—OH bonds, a part of which causes cross-linking when an anti-fogging coating is formed, thereby increasing the strength of the anti-fogging coating. As the cross-linking reaction, there may be included a condensation reaction of the P—OHs themselves or a reaction of the P—OH bonds with the oxide particles to form P—O—M bonds. In this case, M represents a metal ion of the oxide particle. Any phosphoric acid compound which is water-soluble and has P—OH bonds can essentially be used as the phosphoric acid compound binder.

As the phosphoric acid compound which can be used as the phosphoric acid compound binder of the present invention, there may be included phosphoric acid, polyphosphoric acid, a phosphoric acid amine salt (hereinafter, referred to as "amine phosphate), a metal phosphate excluding a metal tertiary phosphate, and the like. Each of these phosphoric acid compounds or a combination of two or more of these phosphoric acid compounds can be used as the phosphoric acid compound binder. Further, for example, ammonium primary-, secondary- or tertiary phosphates, and amine phosphates such as methylamine phosphates, ethylamine phosphates, alkanolamine phosphates can also be used as the phosphoric acid compound binder of the present invention. These amine phosphates decompose at a temperature for forming the anti-fogging coating of the present invention, for example, from room temperature to 500° C. to form P—OH, so as to act as the phosphoric acid compound binder as is the case with phosphoric acid, polyphosphoric acid, or the like. Examples of metal phosphates include zinc primary phosphate, aluminium primary phosphate, and the like. Some of these are used for rustproofing or a refractory cement and are easily available. For example, a water base aluminium primary phosphate sol is supplied from TAKI CHEMICAL CO., LTD. under the trade name of 50L, 100L, or ACIDHOS75. These salts may also be prepared by reacting phosphoric acid with a metal, metal oxide, metal hydroxide, or the like. To the phosphoric acid compound binder used in the present invention, amines, organic acids, surfactants or the like can also be added as needed.

Any oxide particles can be used as the oxide particles of the present invention as long as the average particle diameter is 1 to 300 nm and a transparent film can be obtained by combining with the phosphoric acid compound binder. Basically, the oxide particles used in the present invention are essential for forming porous voids in the anti-fogging coating of the present invention. In addition, the oxide particles react with the P—OHs of the phosphoric acid compound binder, thereby increasing the strength of the anti-fogging coating of the present invention and developing the durability of the anti-fogging coating.

The average particle diameter of the oxide particles used in the present invention is 1 to 300 nm, and preferably 5 to 100 nm, and more preferably 7 to 40 nm. If the average particle diameter is 300 nm or less, then there are no possibilities of impairing the transparency of the anti-fogging coating, and if the particle diameter is 1 nm or more, then the reactivity with the phosphoric acid compound binder becomes moderate, thereby eliminating possibilities of reducing the stability of the anti-fogging coating material.

The oxide particles used in the present invention are preferably used in a form of an oxide particle dispersion having the oxide particles dispersed in a dispersion medium such as water or alcohol for the purpose of easy handleability. Examples of the oxide particle dispersion include, for example, an oxide colloidal sol. Those oxide colloidal sols which are easily available include colloidal silica, colloidal titanium oxide, colloidal aluminium oxide, colloidal zirconium oxide, and so on. Each of these sols can be used alone or a combination of two or more of these sols can also be used. Specific examples of the colloidal silica include water-based sols such as SNOWTEX 20, SNOWTEX 30, SNOWTEX N, SNOWTEX O, and SNOWTEX C (trade names), methanol-based sols, and solvent-based sols such as IPA-ST, EG-ST, and MEK-ST (trade names) commercially available from NISSAN CHEMICAL INDUSTRIES, LTD., and solvent-based sols such as OSCAL-1132, OSCAL-1432, and OSCAL-1232 (trade names) commercially available from CATALYSTS & CHEMICALS IND. CO., LTD. Specific examples of colloidal aluminium oxide include ALUMINASOL 100, and ALUMINASOL 200 (trade names) commercially available from NISSAN CHEMICAL INDUSTRIES, LTD.

For the purpose of improving the dispersion properties of the oxide particles, surfactants or the like may also be added as required. In addition, titanium compounds, silane coupling agents, chelating agents such as β-diketone, or organic acids such as acetic acid may also be added to the oxide particle dispersion or anti-fogging coating material of the present invention in order to modify the surfaces of the oxide particles. Further, the oxide particles may previously be modified by use of these additives and then be dispersed into a dispersion medium such as water or alcohol.

With respect to the anti-fogging coating material according to the present invention, the weight ratio of the phosphoric acid compound binder and the oxide particles, that is, when a dispersion of the phosphoric acid compound binder and the oxide particles is used, a weight ratio of the phosphoric acid compound binder and the oxide particles contained in the dispersion is generally 0.05/0.95 to 0.9/0.1, preferably 0.1/0.9 to 0.8/0.2, and more preferably 0.12/0.88 to 0.5/0.5. The above described weight ratio is expressed as a weight ratio of (the phosphoric acid compound binder/the oxide particles) on solids basis. When the weight ratio on solids basis of (the phosphoric acid compound binder/the oxide particles) is 0.9/0.1 or less, the voids of the anti-fogging coating becomes sufficient and the durability of the anti-fogging coating is also improved. When the weight ratio on solids basis of (the phosphoric acid compound binder/the oxide particles) is 0.05/0.95 or more, the bonding strength between the oxide particles is improved, thereby also improving the strength of the anti-fogging coating.

The total solids content of the anti-fogging material according to the present invention is preferably 0.1 wt % (0.1 percent by weight) to 10 wt % on the basis of the total weight of the anti-fogging coating material. When the total solids content is 10 wt % or less, the possibility that the quality of the anti-fogging coating may be reduced is prevented and the storage stability of the anti-fogging coating material is improved. On the other hand, when the total solids content is 0.1 wt % or more, the efficiency of forming the anti-fogging coating is improved.

It is possible to use a dispersion medium for the anti-fogging coating material according to the present invention as needed. As the dispersion medium used for the present invention, it is possible to use water, organic solvents such as alcohols or ketones, or a mixed solvent thereof. Further, the dispersion medium preferably contains a glycol or a derivative of a glycol. The glycol or derivative of glycol can inhibit generation of cracks or whitening of a coating in a step of drying the coating made from the coating material of the present invention.

As the glycol which can be used for the present invention, there may be included ethylene glycol, propylene glycol, 1,4-butanediol, cyclopentane-1,2-diol, and so on.

Further, as the glycol derivative which can be used for the present invention, there may be included monoesters or diesters, and monoethers or diethers of glycols, and so on. Specific examples of these derivatives include ethylene glycol monoacetate, ethylene glycol diacetate, ethylene glycol monoethyl ether, ethylene glycol monobutyl ether, ethylene glycol diethyl ether, and so on.

The anti-fogging coating material of the present invention can be used with photocatalyst particles added thereto, if desired. When the photocatalyst particles are added, the photocatalyst particles will be excited by a light having a wavelength shorter than a band gap of the photocatalyst particles, thereby improving the oxidizability of the anti-fogging coating according to the present invention. Decomposition of an organic component deposited on a surface of the anti-fogging coating according to the present invention containing photocatalyst particles is accelerated by the photocatalyst particles excited by ultra violet rays contained in natural light, whereby the anti-fogging properties of the surface are improved and maintained.

As the photocatalyst particles which can be used for the present invention, those photocatalyst particles are used which have an average particle diameter of generally 1 to 300 nm, preferably 5 to 100 nm, and more preferably 7 to 50 nm. When the average particle diameter is 300 nm or less, there is no possibility that the transparency of the anti-fogging coating may be impaired, and when the average particle diameter is 1 nm or more, irregular shape components become less to improve the performance of the photocatalyst particles.

As the photocatalyst particles, there may be included anatase titanium oxide, rutile titanium oxide, zinc oxide, tin oxide, ferric oxide, bismuth trioxide, tungsten trioxide, strontium titanate, and so on. In particular, the anatase titanium oxide is easily available in the market. Specific examples of the anatase titanium oxide which can be used for the present invention include a titanium oxide sol such as M-6, A-6, etc. (trade names) commercially available from TAKI CHEMICAL CO., LTD. or STK-251, etc. (trade name) commercially available from TAYCA CORPORATION.

The amount of the photocatalyst particles which can be added to the anti-fogging coating material of the present invention is preferably 50 wt % or less and more preferably 30 wt % or less on the basis of the total solids content of the anti-fogging coating material according to the present invention. When the amount of the photocatalyst particles is 50 wt % or less, the refractive index of the anti-fogging coating will not become too high to provide good optical characteristics, and there is no possibility that the anti-fogging properties may be reduced when the coating is not irradiated with a light.

The anti-fogging coating material according to the present invention can be produced by mixing a phosphoric acid compound binder and oxide particles, and optionally with predetermined amounts of photocatalyst particles, a dispersion medium, and other additives. The method of mixing them is not particularly limited, but a method which is suitable for such an anti-fogging coating material according to the present invention can be selected from well-known methods.

The anti-fogging coating material of the present invention as described above is applied on a base material and cured, and then used as an anti-fogging film. FIGURE is a schematic cross-sectional view showing an embodiment of the anti-fogging optical member in accordance with the present invention, in the surface of which such a coating is formed. In FIGURE, an anti-fogging coating 2 is formed on both sides of a base material 1.

The methods of forming a coating of the anti-fogging coating material of the present invention include a commonly-used spray coating, roll coating, dip coating, and the like. However, the methods are not limited to the above mentioned ones, but any method can be adopted as long as the method is suitable for the anti-fogging coating material of the present invention.

The method of curing the anti-fogging coating material of the present invention is not particularly limited and the methods known to one skilled in the art may be used, but generally a thermal curing method may be used. The curing temperature may be adjusted to an appropriate temperature depending on the reactivity of the phosphoric acid compound binder to be used, the softening temperature of the base material, and the like, and is not particularly limited. The above mentioned curing method is distinguished from radical polymerization or ultraviolet curing of organic polymers.

The base material which can be used for the present invention is not particularly limited, but a glass base material, a metal base material, a ceramic base material, or the like may be included. Specific examples of the glass base materials include a transparent plate-shape base material such as a window glass, a glass substrate, etc. and optical base materials such as a glass lens, a glass filter, a glass mirror, etc. Specific examples of the metal base material include a metal plate-lake base material, a metal mirror, etc. and specific examples of the ceramic base material include a tile, etc.

For the purpose of improving the adhesion between the anti-fogging coating of the present invention and the base material, a surface of the base material may previously be subjected to precoating as needed.

The anti-fogging coating thus obtained is porous and has P—OH bonds in a surface of the pores. Thereby, the anti-fogging coating of the present invention exhibits high hydrophilic properties. Further, the polarity of this anti-fogging coating is high, so that the affinity with water is higher than the conventional silica film and the anti-fogging properties can therefore be maintained at a higher level.

EXAMPLES

The following examples are given for the purpose of illustration and not by way of limitation.

Example 1

150 parts by weight of distilled water and 20 parts by weight of ethylene glycol monobutyl ether were added to 50 parts by weight of an aqueous solution of a water-soluble aluminium primary phosphate (TAKI CHEMICAL CO., LTD.; trade name: 100L; content of water-soluble aluminium primary phosphate: 33 wt %). Then, 200 parts by weight of silica sol having an average particle diameter of 20 nm (CATALYSTS & CHEMICALS IND. CO., LTD.; trade name: OSCAL-1132; dispersion medium: methanol; silica content: about 30 wt %) and 500 parts by weight of ethanol were added thereto to obtain an anti-fogging coating material having a weight ratio on solids basis of water-soluble aluminium phosphate/silica of about 0.23/0.77 and a total solids content of 8.3 wt %. A glass substrate was dipped into this anti-fogging coating material and then pulled up therefrom at a rate of 50 mm/min so as to coat an approximately half of the glass substrate with the anti-fogging coating material, and the glass substrate thus obtained was dried. From this glass substrate thus coated with the anti-fogging coating material, two samples were made. Subsequently, these samples were heat-treated at 300° C. for 1 hour to obtain test pieces 1.

The anti-fogging properties of one of the test pieces were evaluated by breathing upon the test piece. As for an uncoated portion of the test piece, fogging was caused and the anti-fogging properties were insufficient. As for a coated portion of the test piece, fogging was not observed. Further, the test piece was kept in the air for ten days, and the anti-fogging properties were evaluated by breathing upon the test piece. As for an uncoated portion of the test piece, fogging was caused and the anti-fogging properties were insufficient. As for a coated portion of the test piece, fogging was not observed and the anti-fogging properties were maintained. Another test piece was used to observe a cross section of the coating by an electron microscope, with the result that the coating was porous and had a thickness of about 0.2 µm.

Example 2

After adding 5 parts by weight of acetyl acetone and 10 parts by weight of ethylene glycol monobutyl ether to 100 parts by weight of ethanol, 40 parts by weight of a dispersion liquid of anatase titanium oxide (TAYCA CORPORATION; trade name: STK-251; dispersion medium: toluene; content of anatase titanium oxide: 30 wt %) and 150 parts by weight of silica sol having an average particle diameter of 20 nm (CATALYSTS & CHEMICALS IND. CO., LTD.; trade name: OSCAL-1132; dispersion medium: methanol; silica content: 30 wt %) were added thereto to obtain a mixed solution A. Separately, 12 parts by weight of phosphoric acid (85 wt %) was added to 500 parts by weight of ethanol to obtain a mixed solution B. Then, the mixed solution A and the mixed solution B were mixed with each other to obtain an anti-fogging coating material having a weight ratio on solids basis of phosphoric acid/(silica+titanium oxide) of 0.15/0.85 and a total solid content of 8.2 wt %. This coating material was partially coated on a glass substrate and dried, and then heat-treated at 400° C. for 1 hour to make two test pieces 2.

One of the test piece 2 was exposed to an outdoor environment for two months, and the surface of the test piece was visually observed. An uncoated portion of the test piece was contaminated, but a coated portion of the test piece remained clean. Further, the anti-fogging properties of this test piece were evaluated by breathing upon the test piece. As for a coated portion of the test piece, fogging was not caused and the anti-fogging properties were maintained. As a result of observing a cross section of the other test piece 2, it was found that the anti-fogging coating was porous and had a thickness of about 0.2 µm.

Example 3

100 parts by weight of distilled water was added to 150 parts by weight of alumina sol having an average particle diameter of 20 nm (NISSAN CHEMICAL INDUSTRIES, LTD.; trade name: ALUMINASOL520; dispersion medium: water; alumina content: 20 wt %), and mixed with each other under stirring to prepare a homogeneous dispersion. Subsequently, 25 parts by weight of ethanol amine secondary phosphate was added to the dispersion and the dispersion thus obtained was continuously stirred. Then, the mixture was diluted with 10 parts by weight of ethylene glycol and 400 parts by weight of ethanol to obtain an anti-fogging coating material having a weight ratio on solid basis of ethanol amine secondary phosphate/alumina of 0.45/0.55 and a total solid content of 8 wt %. A glass substrate was partially dip-coated with this anti-fogging coating material and dried, and then the glass substrate was heat-treated at 400° C. for 1 hour to make a test piece 3.

The anti-fogging properties of this test piece 3 were evaluated by breathing upon the test piece. As for a coated portion of the test piece, fogging was not caused and the anti-fogging properties were good.

Example 4

150 parts by weight of distilled water and 20 parts by weight of ethylene glycol monobutyl ether were added to 50 parts by weight of an aqueous solution of a water-soluble aluminium primary phosphate (TAKI CHEMICAL CO., LTD.; trade name: 50L; content of water-soluble aluminium primary phosphate: 33 wt %). Subsequently, 200 parts by weight of a dispersion of silica sol having an average particle diameter of 20 nm (NISSAN CHEMICAL INDUSTRIES, LTD.; trade name: SNOWTEX C; dispersion medium: water; silica content: 20 wt %) and 500 parts by weight of ethanol were added thereto to obtain an anti-fogging coating material having a weight ratio on solids basis of water soluble aluminium phosphate/silica of 0.29/0.71 and a total solids content of 5.8 wt %. A glass mirror was dip-coated partially with this anti-fogging coating material and dried, and then the glass mirror was heat-treated at 300° C. for 1 hour to make a test piece 4.

As a result of evaluating the anti-fogging properties of the test piece 4 by breathing upon the test piece 4, it was found that a coated portion of the test piece was not fogged, and the anti-fogging properties were good. Further, the test piece was disposed at a height of 1 cm above a surface of hot water of 75° C. such that the surface of the test piece and the surface of the hot water were parallel to each other, then the changes occurred in the surface of the test piece were observed. As for an uncoated portion of the test piece, water droplets were made on the surface and an image reflected in the mirror disappeared. As for a coated portion of the test piece, the function of the mirror was maintained although a water film was formed.

Example 5

After adding 5 parts by weight of acetyl acetone and 10 parts by weight of ethylene glycol monobutyl ether to 100 parts by weight of ethanol, 40 parts by weight of a dispersion liquid of anatase titanium oxide (TAYCA CORPORATION; trade name: STK-251; dispersion medium: toluene; content of anatase titanium oxide: 20 wt %) and 150 parts by weight of a dispersion of silica sol having an average particle diameter of 20 nm (CATALYSTS & CHEMICALS IND. CO., LTD.; trade name OSCAL-1132; dispersion medium: methanol; silica content: 30 wt %) were added thereto to obtain a mixed solution C. Separately, 40 parts by weight of phosphoric acid (85 wt %) was added to 500 parts by weight of ethanol to obtain a mixed solution D. Then, the mixed solution C and the mixed solution D were mixed with each other to obtain an anti-fogging coating material having a weight ratio on solids basis of phosphoric acid/(silica+ titanium oxide) of 0.25/0.75 and a total solids content of 6.7 wt %. This coating material was partially coated on a glass substrate and dried, and then heat-treated at 400° C. for 1 hour to make a test piece 5.

The test piece 5 was kept in the air at room temperature for about one month, then the anti-fogging properties were evaluated by breathing upon the test piece 5. As for a coated portion of the test piece, fogging was not observed. Further, tap water was made to flow over the surface of this test piece, with the result that deposits on the surface were almost removed.

Comparative Example 1

140 parts by weight of an oligomer solution of ethyl silicate (COLCOAT CO.; trade name: Ethyl Silicate 40; silica content: 40 wt %) were added to 720 parts by weight of ethanol with stirring, and further, 140 parts by weight of a 0.01N aqueous solution of hydrochloric acid was added thereto slowly. Subsequently, the mixture was allowed to react at room temperature for one day to obtain a coating material. A glass substrate was partially dip-coated with this coating material and dried, and then this substrate was heat-treated at 150° C. for 1 hour to make a test piece C1.

After being kept in the air at room temperature for a week, the anti-fogging properties of the test piece C1 were evaluated by breathing upon the test piece. As a result of visual observation of the test piece C1, both coated and uncoated portions were fogged. It was found that the anti-fogging properties of the coated portion were insufficient as is the case with the uncoated portion.

Comparative Example 2

850 parts by weight of distilled water and 20 parts by weight of ethylene glycol monobutyl ether were added to 50 parts by weight of an aqueous solution of a water-soluble aluminium phosphate (TAKI CHEMICAL CO., LTD.; trade name 100L; content of water-soluble aluminium phosphate: 33 wt %) to obtain a coating material. A glass substrate was dip-coated with this coating material and dried, and then the glass substrate thus obtained was heat-treated at 500° C. for one hour to make a test piece C2.

The test piece C2 together with the test piece 1 prepared in Example 1 were disposed and allowed to stand at a height of 1 cm above a surface of hot water of 50° C. such that the surfaces of the test pieces and the surface of the hot water were parallel to each other, and the formation of a water film was observed. The formation of the water film was visually observed through the test pieces. As for the test piece C2 of this Comparative Example, an image which could be seen through the test piece began to be distorted after a time lapse of 12 seconds. On the contrary, as for the test piece 1 from Example 1, an image through the test piece began to be distorted after a time lapse of 15 seconds. It is believed that the coating of the test piece 1 prepared in Example 1 becomes porous because of the presence of silica particles, so that this coating has anti-fogging properties which are higher than the test piece C2 of this Comparative Example.

As described above, the anti-fogging coating material of the present invention can form a coating having excellent anti-fogging properties. The anti-fogging coating thus formed has high hydrophilic properties in its surface and is also excellent in water resistance. Further, the anti-fogging coating is porous and has higher water absorption properties, so that the surface will not be fogged even in an environment in which the humidity varies considerably and it is also possible to delay formation of a water film. Therefore, the optical member having the coating of the present invention formed on a surface thereof has excellent anti-fogging properties and is possible to exhibit technical effect superior to that of the prior art.

What is claimed is:

1. An anti-fogging coating material for forming a transparent anti-fogging coating film, comprising a phosphoric acid compound binder; and oxide particles having an average particle diameter of 1 to 300 nm mixed and cross-linked with the phosphoric acid compound binder, wherein a weight ratio on solids basis for the phosphoric acid compound binder and the oxide particles is 0.12/0.88 to 0.5/0.5.

2. The anti-fogging coating material according to claim 1, wherein the phosphoric acid compound binder comprises at least one selected from a group consisting of phosphoric acid, polyphosphoric acid, an amine phosphate, a water-soluble metal primary phosphate, and a water-soluble metal secondary phosphate.

3. The anti-fogging coating material according to claim 1, wherein the oxide particle comprises at least one selected from a group consisting of silica particles, aluminum oxide particles, titanium oxide particles, and zirconium oxide particles.

4. The anti-fogging coating material according to claim 1, further comprising particles having a photocatalytic function.

5. The anti-fogging coating material according to claim 4, wherein the particles having the photocatalytic function comprises anatase titanium oxide having an average particle diameter of 1 to 300 nm.

6. The anti-fogging coating material according to claim 1, further comprising any one of a glycol and a derivative of a glycol.

7. An anti-fogging coating formed by using the anti-fogging coating material as set forth in claim 1.

8. An anti-fogging optical member, comprising a base material; and an anti-fogging coating formed on the base material by using the anti-fogging coating material as set forth in claim 1.

9. The anti-fogging optical member according to claim 8, wherein the base material comprises any one of a glass base material, a metal base material, and a ceramic base material.

10. The anti-fogging optical member according to claim 8, wherein the base material comprises a glass mirror or a metal mirror.

* * * * *